US007916442B2

(12) United States Patent
Anheuser et al.

(10) Patent No.: US 7,916,442 B2
(45) Date of Patent: Mar. 29, 2011

(54) BREAKER DEVICE FOR LOW-VOLTAGE APPLICATIONS

(75) Inventors: Michael Anheuser, Dienheim (DE); Gerd Griepentrog, Gutenstetten (DE); Reinhard Maier, Herzogenaurach (DE); Bernd Trautmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 499 days.

(21) Appl. No.: 11/658,838

(22) PCT Filed: Jul. 26, 2005

(86) PCT No.: PCT/EP2005/053642
§ 371 (c)(1),
(2), (4) Date: Sep. 15, 2008

(87) PCT Pub. No.: WO2006/010760
PCT Pub. Date: Feb. 2, 2006

(65) Prior Publication Data
US 2009/0046403 A1 Feb. 19, 2009

(30) Foreign Application Priority Data
Jul. 27, 2004 (DE) ......................... 10 2004 036 279

(51) Int. Cl.
*H02H 7/00* (2006.01)

(52) U.S. Cl. ...................................................... 361/93.1

(58) Field of Classification Search .................. 361/93.1
See application file for complete search history.

(56) References Cited

U.S. PATENT DOCUMENTS

| | | | | |
|---|---|---|---|---|
| 3,824,508 | A * | 7/1974 | Terracol | 335/16 |
| 4,042,895 | A | 8/1977 | Wafer et al. | |
| 5,694,098 | A * | 12/1997 | Mody et al. | 335/16 |
| 5,793,270 | A * | 8/1998 | Beck et al. | 335/16 |
| 5,859,579 | A | 1/1999 | Branston et al. | |
| 6,313,639 | B1 | 11/2001 | Griepentrog | |
| 6,724,597 | B1 | 4/2004 | Elischer et al. | |

FOREIGN PATENT DOCUMENTS

| | | | |
|---|---|---|---|
| DE | 1 005 163 | A1 | 3/1957 |
| DE | 44 25 330 | | 1/1996 |
| DE | 197 29 599 | C1 | 2/1999 |
| EP | 0 450 104 | B1 | 10/1991 |
| WO | 95/03619 | A1 | 2/1995 |

OTHER PUBLICATIONS

M. Lindmayer et al. "Digitale Algorithmen Zur Freuhzeitigen Kurzschlusserkennung", Elektrotechnische Zeitung—ETZ, VDE Verlag Gmbh, Berlin; vol. 112, No. 13/14, 1991; pp. 718, 720-722.
G. Rivetti et al., "Intelligenz in Niederspannungs Leistungsschaltern"; ABB Technik, vol. 4, ABB Asea Brown Boveri, Zurich, 1997, pp. 41-46.
International Search Report for Application No. PCT/EP2005/053642; mailed Nov. 21, 2005.
German Office Action for Application No. 10 2004 036 279.3-34; dated Jul. 19, 2005.

* cited by examiner

*Primary Examiner* — Stephen W Jackson
(74) *Attorney, Agent, or Firm* — Staas & Halsey LLP

(57) ABSTRACT

In breaker devices an early short-circuit recognition is required and also a tripping of the contacts. The recognition of a short-circuit occurs so early that with consideration of the response time of the measuring probes and the unlocking mechanism by a suitable analysis algorithm the release of the movable contact occurs before or at least at the time that the current-breaking forces correspond to the contact force. The contact force is hence compensated for and a rapid opening of the contacts can be achieved.

11 Claims, 2 Drawing Sheets

BREAKER DEVICE FOR LOW-VOLTAGE APPLICATIONS

CROSS REFERENCE TO RELATED APPLICATIONS

This application is based on and hereby claims priority to German Application No. 10 2004 036 279.3 filed on Jul. 27, 2004, the contents of which are hereby incorporated by reference.

BACKGROUND

Described below is a breaker device for low-voltage applications with at least one fixed contact and at least one movable contact.

Breakers for low-voltage applications are known for example from DE 10 05163 C1, DE 200414892 36 743 44 25 330 A1 or EP 04 50 104 B1. They consist of at least one fixed contact and at least one movable contact with associated drive, which is able to be actuated either in particular electrically or also magnetically and is activated by a specific algorithm. In DE 197 29 599 C1 triggering criteria on the basis of current (I) and current steepness(di/dt) are described, with an advantageous evaluation algorithm being derived from these values.

In known low-voltage power circuit breakers, the main contacts are usually opened via a mechanically operating switching lock. This can be tripped manually at the actuation level—or also automatically by thermal, magnetic or electronic actuators, if these detect an overcurrent. The operating times of the switching lock lie in the range of several ms, so that even in the case of larger short circuits the available electrodynamic forces from the current loop do not lead directly to contact opening, but are initially only directed against the forces of the locked switching lock.

Electronic short circuit breakers can be equipped with what is known as an "electromagnetic bypass" in order to bring about fast actuation with large short circuit currents.

Previously efforts have been made to resolve the problem in a better way than the above-mentioned triggering chain by creating an additional pivot point using an additional support, which however holds the contact closed temporarily with additional springs or guides. Only with extreme currents can electrodynamic forces overcome these spring forces and also bring about a temporary or final opening of the contacts without the aid of a switching lock.

The dimensioning of the switching device must however insure that the switching lock unlocks if there is a fault in the short circuit actuator. In the individual case a different triggering chain can be selected.

After execution of the dynamic processes the main contacts remain open. Many devices also allow temporary opening without there being a final forced opening by the lock.

SUMMARY

Using this as its starting point, aspect is to create a breaker device which responds more quickly than in the related art.

This enables an improved breaker device to be implemented. The idea is to use in the new breaker device a specific method for early detection of short circuits in which the impending short circuit is detected at an early stage before it reaches the currents necessary to disengage the contacts. Thus, the operating times of the measurement probes as well as the unlocking mechanism can than be taken into account.

For early short circuit detection methods based on the evaluation of the current i and the current steepness di/dt, i.e. locus curve methods, especially the use of what are known as. "tolerant locus curves (TOK)" in accordance with DE 197 29 599 C are advantageously used. However other methods are also possible, for example traveling wave methods.

As a result, a short circuit is detected by a suitable algorithm early enough to take into account the delay times of the measurement probes as well as the unlocking mechanism, the movable contact is released before or at least at the point in time at which the current lifting forces correspond to the contact force.

Two device concepts are possible within the described framework:

1) Early detection of short circuits (KFE) operates only on the trigger chain—of whatever type—opens the lock early and avoids the contacts coming together again. The contact system is designed in this case so that an inherently dynamic opening is possible. This moves the unlocking time of the lock forwards, a bypass (electromechanical, pneumatic, electronic or similar) is not needed. Despite this the breaker, e.g. in the case of selectivity, can act as an additional limiter without breaking the circuit.
2) The short circuit (KS) early detection operates on the triggering chain—of whatever type, opens the lock in good time and avoids the contacts coming back together. In parallel a locking of the contacts is opened and opening as a result of the inherent dynamics is possible. This moves the unlocking time of the lock forwards, a bypass is not needed. Contact welding can thus not occur since the contacts are always open when disengaging and this occurs with a relatively low disengagement limit.

In an advantageous embodiment, the mechanical conditions at the breaker device can be modified and simplified in that

- any second pivot point in the mechanical contact system is dispensed with and/or
- a decoupling of the actuation from the dynamic contact opening is achieved.

A direct unlocking of the movable contacts is actually additionally provided, and these can be quickly unlocked from the switching lock by an eddy current (=Thomson) drive. Thereafter the current disengagement forces are fully effective and the contacts can be opened rapidly:

BRIEF DESCRIPTION OF THE DRAWINGS

These and other objects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
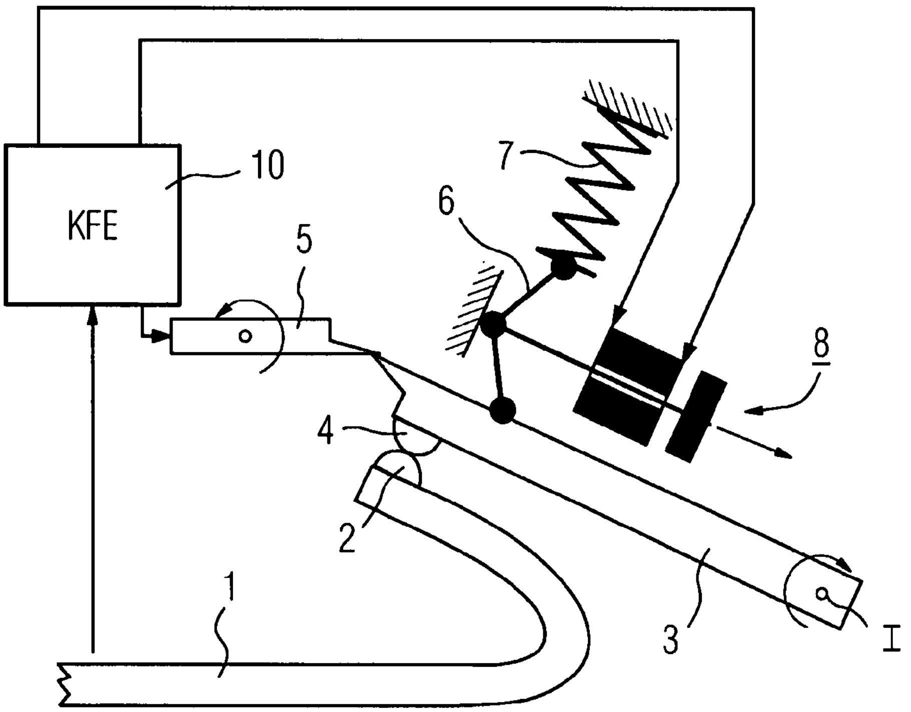
FIG. 1 is a schematic diagram showing a cross-section of a contact arrangement.

Reference will now be made in detail to the preferred embodiments, examples of which are illustrated in the accompanying drawings, wherein like reference numerals refer to like elements throughout.

Breaker devices of the related art have a breaker lock which is activated by the overcurrent trigger. Thus opens the contacts against the contact force acting to close them, whereby a mechanical triggering chain is defined. On opening of the contacts, at the latest an equivalent disengagement force is produced between the contacts.

Known breaker devices have previously suffered from that fact that there are or can be current ranges in which the contact force directed to closing is already compensated for by the force operating from the current loop to open the contacts, that levitation of the contacts with arcing already occurs before the actuators unlock the lock.

The arrangement described below provides a remedy:

FIG. 1 shows a fixed contact carrier 1 for a fixed contact 2 to which a contact carrier 3 for a movable contact 4 is assigned. The contact support 3 can be pivoted around an axis 1.

A latch 5 and a toggle system 6 are assigned to the movable contact 4, with which the contact carrier 3 can be activated. The toggle system 6 is connected via a spring to the housing or to another fixed reference point. The toggle mechanism 6 in FIG. 1 is specifically actuated by a Thomson drive 8, which is known and operates in accordance with the eddy principle and is comparatively fast.

Furthermore in FIG. 1 a unit 10 for early detection of short circuits (KFE) is present. The KFE unit 10 advantageously operates in accordance with the locus curve method with the coordinates i and di/dt, for example in accordance with the tolerant locus curve (TOK) method, for which the evaluation algorithm is described in detail in DE 197 29 599 C mentioned above, the disclosure of which is also an aspect of the present application documents and therefore is incorporated by reference. This evaluation algorithm is especially suitable for the present application and can also take account of such situations as bias current events. The TOK evaluation algorithm is stored as software in the memory of an associated microcontroller, not shown in FIG. 1.

If necessary other fast-operating methods for early detection of short circuits can also be employed in the KFE 10.

Figure 2:
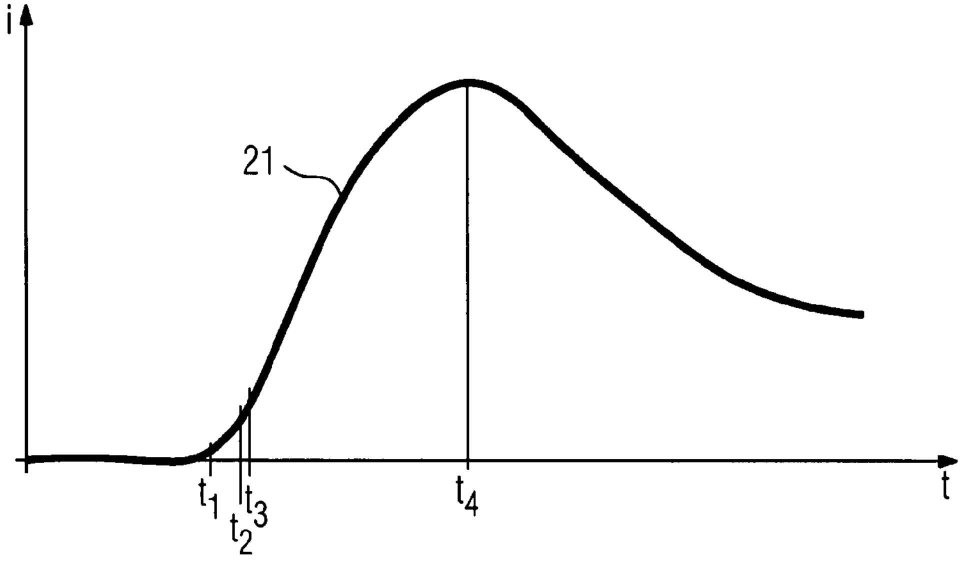
FIG. 2 is a graph of the current for a breaker device in accordance with FIG. 1

FIG. 2 shows the timing graph for the break process of the contact arrangement shown in FIG. 1: The time t is plotted on the abscissa and the associated arcing current i is plotted in any given unit on the ordinate. The graph 21 shows the current curve when a short circuit occurs.

Figure 3:
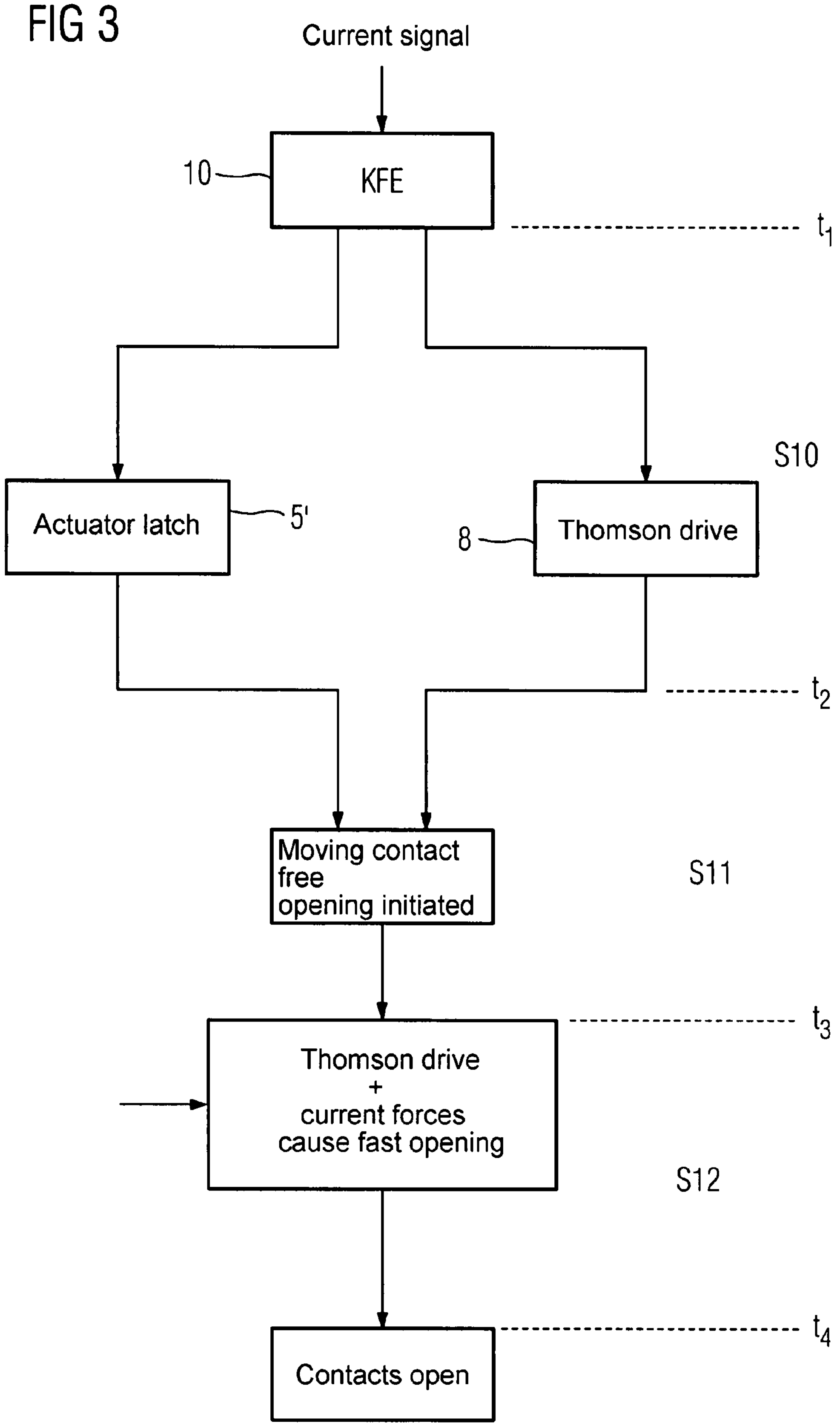
FIG. 3 is a flowchart to illustrate the functional sequence for the breaker device in accordance with FIG. 1.

With reference to the flowchart of FIG. 3, the interaction of the unit 10 for early detection of short circuits (KFE) with specific evaluation algorithm with the unlocking mechanism 5 on the one hand and the drive 6 for the contact carrier 3 on the other hand can be seen: After detection of the short circuit in the KFE 10 at point in time t1, represented by S10, on the one hand a signal is sent to an actuator 5' for the latch 5 and on the other hand current is supplied to the Thomson drive 8. At point in time t2 the latch 5 is free and the Thomson drive 8 is actuated. Then, as represented by S11, at a point in time at which the movable contact 4 is free, the opening of the contacts 2, 3 is initiated.

Through the current forces operating on the contact system the opening movement is advantageously accelerated. By point in time t3, the current forces exceed the holding or contact forces. The contacts 2, 3 open more quickly in during the time represented by S12. By contact time t4 the contacts 2, 3 are completely opened. The arc then decays by the appropriate end time and the current i is extinguished.

The latter is reflected by the current time curve i(t) in accordance with FIG. 2 which has already been discussed above. The shape of the graph 21 shows that, after the unit 10 for early detection of short circuits responds at point in time t1, an actuation of the latch 5 of the breaker device in accordance with FIG. 1 has already occurred by point in time t2. At point in time t3 the disengagement forces are immediately acting to open the contacts, with the contacts being open by point in time t4.

From the shape of the timing graph of the current i in FIG. 2 it can be seen that early detection of the short circuit in the unit for early detection of short circuits 10 makes it possible to put an actuation chain into effect before the disengagement limit of the contact system is reached. This means that mechanical actuation forces are already put into effect at a very early stage. The disadvantages of a slow actuation chain mechanism for opening the contacts can thus be compensated for.

The release is now not related solely to the equilibrium of the forces. The problem which typically arises in this case is that, in the related art, the actuation chain mechanism is too slow to avoid the contacts coming together in the event of a short circuit. It is however sufficient for the lock to open the contacts before these close again because of the lack of inherent dynamics.

With a breaker device with an arrangement as depicted in FIG. 1 the breaker contacts 2 and 4 can be opened more rapidly than with known breaker devices.

Overall the method thus guarantees, that taking into account the operating times of the measurement probes, of the evaluation algorithm and of the unlocking mechanism, the movable contacts are released before or at least at the time at which the current disengagement forces correspond to the contact force.

The present arrangement described for a breaker device with a movable contact able to be pivoted around an axis can also be transferred to breaker devices with bridge contacts.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A breaker device for low voltage applications, comprising:

at least one fixed contact;

at least one movable contact;

an actuator unit opening the contacts using an unlocking mechanism; and a detection unit having measurement probes, providing early detection of short circuits and operating so quickly, that, taking into account operating times of the measurement probes and the unlocking mechanism as determined by an evaluation algorithm, the at least one movable contact is released by a point in time at which electrodynamic disengagement forces arising as a result of current flow correspond to a contact force.

2. A breaker device as claimed in claim 1, wherein the detection unit detects short circuits using a locus curve method.

3. A breaker device as claimed in claim 2, wherein the locus curve method uses a tolerant locus curve algorithm.

4. A breaker device as claimed in claim 3, wherein the tolerant locus curve algorithm takes account of bias current events.

5. A breaker device as claimed in claim 1, wherein the unlocking mechanism includes a latch for locking/unlocking the at least one movable contact.

6. A breaker device as claimed in claim 5, wherein the latch can be controlled directly by the detection unit.

7. A breaker device as claimed in claim 6, wherein said actuator unit further includes an eddy current drive.

8. A breaker device as claimed claim 7, further comprising a contact carrier for said movable contact, and wherein the eddy current drive operates via a toggle system on the contact carrier for said movable contact.

9. A breaker device as claimed in claim 8, wherein said actuator unit includes, in addition to the eddy current drive, a separator actuator for the latch, and wherein the separator actuator and the eddy current drive can be activated simultaneously by the evaluation algorithm.

10. A breaker device as claimed in claim 9, wherein the evaluation algorithm takes into account disengagement forces of the at least one fixed contact and the at least one movable contact caused by the current flow.

11. A breaker device as claimed in claim 9, wherein said detection unit includes a microcontroller having a memory storing the evaluation algorithm.

* * * * *